United States Patent
Clearman (10) Patent No.: US 9,551,915 B2
(45) Date of Patent: Jan. 24, 2017

(54) SWIVEL WRIST MOUNT

(71) Applicant: GoPro, Inc., San Mateo, CA (US)

(72) Inventor: Christopher Aaron Clearman, Half Moon Bay, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/882,771

(22) Filed: Oct. 14, 2015

(65) Prior Publication Data
US 2016/0131963 A1    May 12, 2016

Related U.S. Application Data

(60) Provisional application No. 62/076,671, filed on Nov. 7, 2014.

(51) Int. Cl.
| | |
|---|---|
| F16M 13/04 | (2006.01) |
| G03B 17/56 | (2006.01) |
| A45F 5/00 | (2006.01) |

(52) U.S. Cl.
CPC ........... *G03B 17/561* (2013.01); *A45F 5/00* (2013.01); *F16M 13/04* (2013.01); *A45F 2005/008* (2013.01); *A45F 2200/0533* (2013.01)

(58) Field of Classification Search
USPC ........................................ 396/428
See application file for complete search history.

(56) References Cited

U.S. PATENT DOCUMENTS

| | | | |
|---|---|---|---|
| 6,360,928 B1 * | 3/2002 | Russo ............... | A45F 5/00 224/218 |
| 8,328,055 B1 | 12/2012 | Snyder | |
| 8,371,729 B2 * | 2/2013 | Sharrah ............. | F21S 9/02 362/439 |

(Continued)

OTHER PUBLICATIONS

"WoCase 360 Degree Panoramic Swiveling Glove Mount Hand Mount (Compatible with left handed) for GoPro HERO4 HERO3+3 2 1 Cameras (Rotary Mount, Retail Package, Gifting Ready)," Amazon.com, Jul. 11, 2013, 6 pages, [online] [retrieved on Dec. 18, 2015] Retrieved from the internet <URL:http://www.amazon.com/WoCase-Panoramic-Swiveling-Compatible-Cameras/dp/B00HML YMHW/ref=pd_sim_sbs_421_1 ?ie=UTF8 &dpID=51 %2BoLD9jb2L&dpSrc=sims&preST= AC_UL 160_ SR 160%2C160_&refRID=097XMG8E8BDXQAJRSSOD>.

(Continued)

*Primary Examiner* — Clayton E Laballe
*Assistant Examiner* — Linda B Smith
(74) *Attorney, Agent, or Firm* — Fenwick & West LLP (57) ABSTRACT

A camera mount for coupling a camera to a user's wrist is described. The camera mount includes a swivel component that rotates relative to a wrist component when an above-threshold amount of force is applied on the swivel component. A rippled spring component is coupled between the swivel component and the wrist component, and exerts an outward force upon the swivel component in response to a compressive force exerted on the rippled spring component by the swivel component. A strap couples to each of two sides of the wrist mount component, and is configured to secure the camera mount to the user's wrist. The camera mount can additionally include a base component and a padding component, and a screw to couple each camera mount component together.

18 Claims, 12 Drawing Sheets

(56) References Cited

U.S. PATENT DOCUMENTS

| | | | | |
|---|---|---|---|---|
| 9,204,710 | B1 * | 12/2015 | Burns | A45F 5/00 |
| 9,243,739 | B2 * | 1/2016 | Peters | F16M 13/00 |
| 2003/0085244 | A1 * | 5/2003 | Parsons | A45F 5/02 |
| | | | | 224/197 |
| 2008/0063392 | A1 * | 3/2008 | Ahn | G03B 17/02 |
| | | | | 396/423 |
| 2009/0003821 | A1 * | 1/2009 | Son | G03B 17/00 |
| | | | | 396/423 |
| 2009/0321483 | A1 * | 12/2009 | Froloff | A45F 5/00 |
| | | | | 224/267 |
| 2013/0170823 | A1 | 7/2013 | McDonald et al. | |
| 2014/0231475 | A1 | 8/2014 | Donnelly | |
| 2014/0252188 | A1 | 9/2014 | Webster | |

OTHER PUBLICATIONS

PCT International Search Report and Written Opinion for PCT/US15/56478, Jan. 15, 2016, 9 Pages.

\* cited by examiner

SWIVEL WRIST MOUNT

CROSS REFERENCE TO RELATED APPLICATIONS

This application claims the benefit of U.S. Provisional Application No. 62/076,671, filed Nov. 7, 2014, which is incorporated by reference in its entirety.

BACKGROUND

Technical Field

This disclosure relates to a camera mounting system, and more specifically, to a wrist-mounted camera mounting system.

Description of the Related Art

Digital cameras are increasingly used in outdoors and sports environments. In order to secure cameras to sports equipment (such as sports boards, helmets, vehicles, and the like), cameras can be coupled to mounts that are mounted on the sports equipment. Conventional mounting systems can be limited in the directions and orientations in which a camera can be configured, limiting the utility and flexibility of the camera, and potentially decreasing a user's satisfaction with the camera and mounting system.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system can include a camera and a camera housing structured to at least partially enclose the camera. The camera can include a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing can include a lens window structured on the front surface of the camera housing and configured to substantially align with the camera lens, and one or more indicator windows structured on the front surface of the camera housing and configured to substantially align with the camera indicators.

Figure 1A:
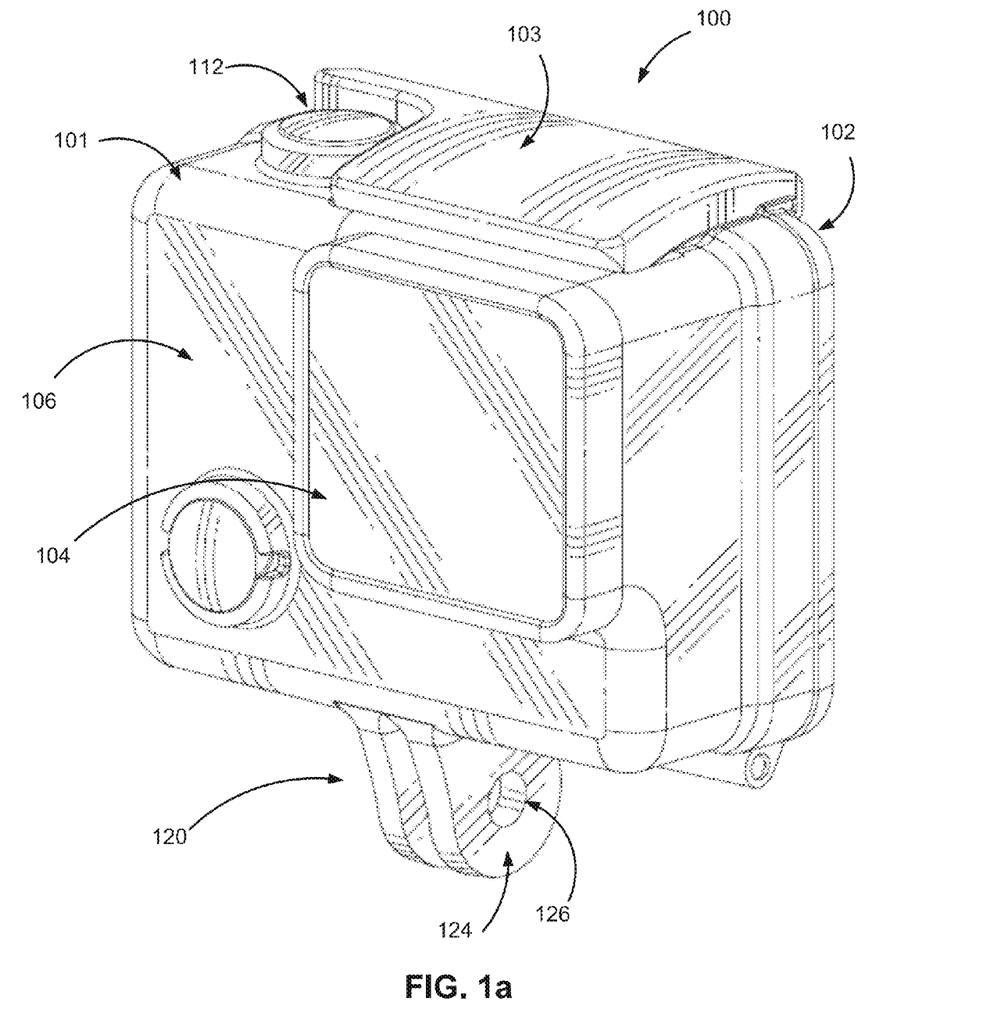
FIG. 1a illustrates a perspective view of a camera system, according to one embodiment.
Figure 1B:
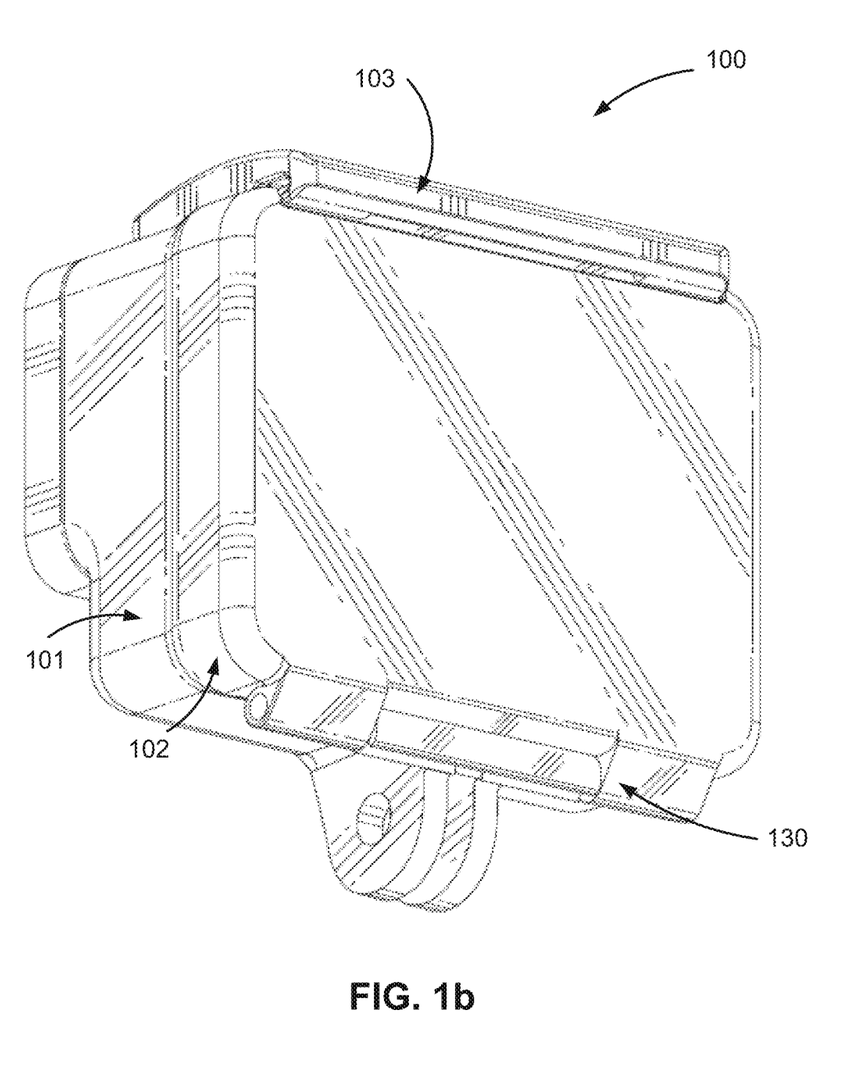
FIG. 1b illustrates a perspective view of a rear of the camera system, according to one embodiment.

FIGS. 1a and 1b illustrate various views of a camera system according to one example embodiment. The camera system includes, among other components, a camera housing 100. In one embodiment, a first housing portion 101 includes a front face with four sides (i.e., a top side, bottom side, left side, and right side) structured to form a cavity that receives a camera (e.g. a still camera or video camera), and a second housing portion 102 structured to couple to the first housing portion 101 and securely enclose a camera within the camera housing 100. The first housing portion 101 and second housing portion 102 can be pivotally coupled via a hinge mechanism (described in greater detail in FIG. 1b), and can securely couple via a latch mechanism 103. In some embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens.

In one embodiment, the camera housing 100 includes one or more securing structures 120 for securing the camera housing 100 to one of a variety of mounting devices such as a clip-style mount. In the embodiment of FIG. 1a, the camera housing 100 includes a plurality of protrusions 124, each including a hole 126 configured to receive a coupling mechanism, for instance, a turnable handscrew to pivotally couple the camera housing 100 to a mounting device including a plurality of reciprocal protrusions. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

FIG. 1b is a rear perspective view of camera housing 100, according to one example embodiment. The second housing portion 102 detachably couples with the first housing portion 101 opposite the front face of the first housing portion 101. The first housing portion 101 and second housing portion 102 are collectively structured to enclose a camera within the cavity formed when the second housing portion 102 is securely coupled to the first housing portion 101 in a closed position.

In one embodiment, the second housing portion 102 pivots around a hinge mechanism 130, allowing the second housing portion 102 to be either in a closed position relative to the first housing portion 101 (for instance, when the second housing portion 102 is securely coupled to the first housing portion 101 via the latch mechanism 103), or in an open position (when the first housing portion 101 and the second housing portion 102 are not coupled via the latch mechanism 103). In the open position, a camera can be removed from or placed into the camera housing 100, and in the closed position, the camera can be securely enclosed within the camera housing 100. In one embodiment, the latch mechanism 103 includes a hook-shaped lateral bar configured to securely couple around a reciprocal structure of the second housing portion 102. In different embodiments, the latch mechanism 103 includes different fastening structures for securing the second housing portion 102 to the first housing portion 101, for example a button assembly, a buckle assembly, a clip assembly, a hook and loop assembly, a magnet assembly, a ball and catch assembly, and an adhesive assembly, or any other type of securing mechanism.

In one alternative embodiment, the hinge 130 is instead located on the top face of the housing 100, and the latch mechanism 103 is located on the bottom face of the housing 100. Alternatively, the hinge 130 and the latch mechanism 103 may be located on opposite side faces of the camera housing 100.

In one embodiment, the housing 100 includes a watertight seal so that the housing 100 is waterproof when the second housing portion 102 is in the closed position. For example, in one embodiment, the second housing portion 102 includes a sealing structure positioned on interior edges of the second housing portion 102. The sealing structure provides a watertight seal between the first housing portion 101 and the second housing portion when the latch mechanism securely couples the housing portions.

Figure 2A:
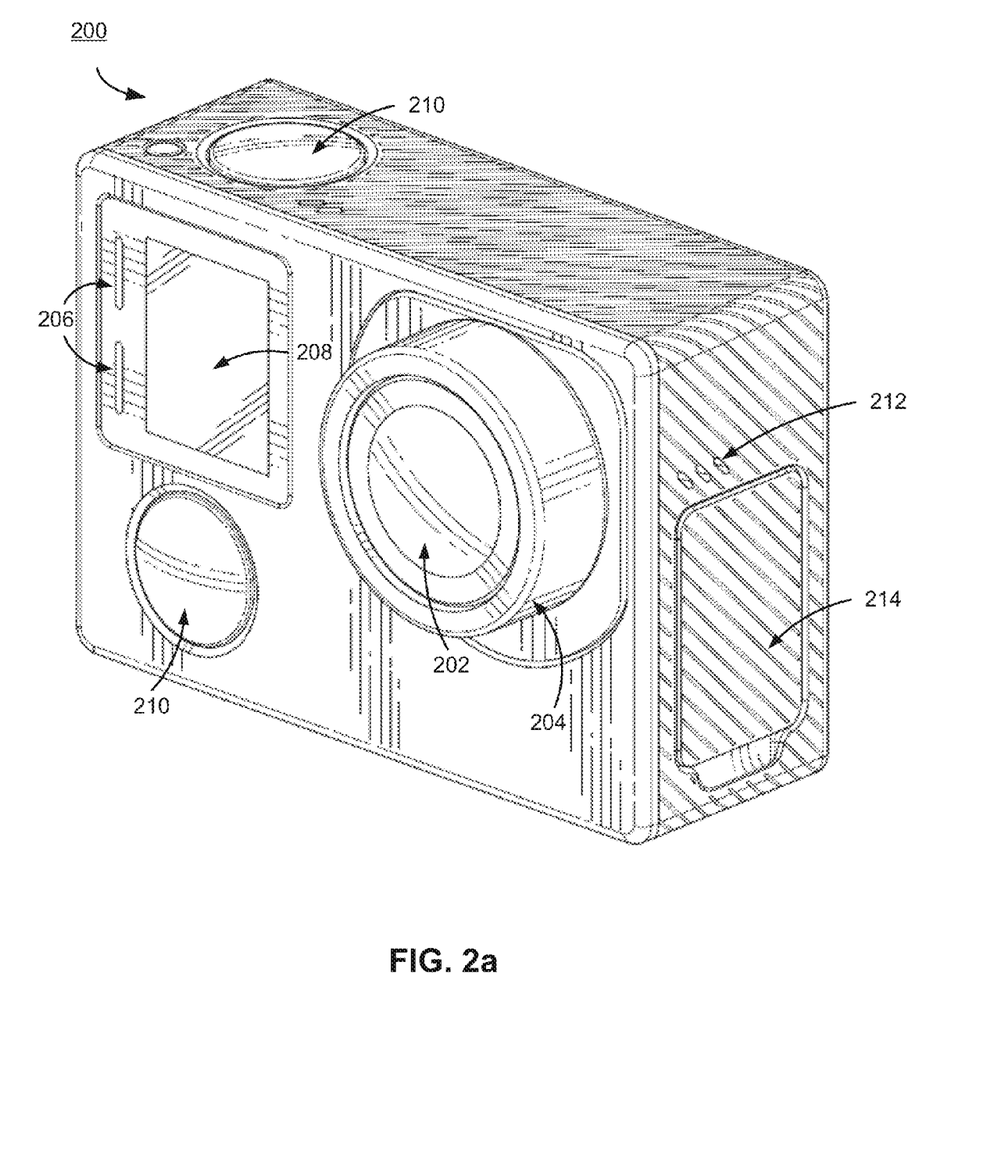
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens for capture by the image sensor. The lens 202 is enclosed by a lens ring 204.

The camera 200 can include various indicators, including the LED lights 206 and the LED display 208 shown in FIG. 2a. When the camera 200 is enclosed within the housing 100, the LED lights and the LED display 208 are configured to substantially align with the indicator window 106 and be visible through the housing 100. The camera 200 can also include buttons 210 configured to allow a user of the camera to interact with the camera, to turn the camera on, to initiate the capture of video or images, and to otherwise configure the operating mode of the camera. The camera 200 can also include one or more microphones 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
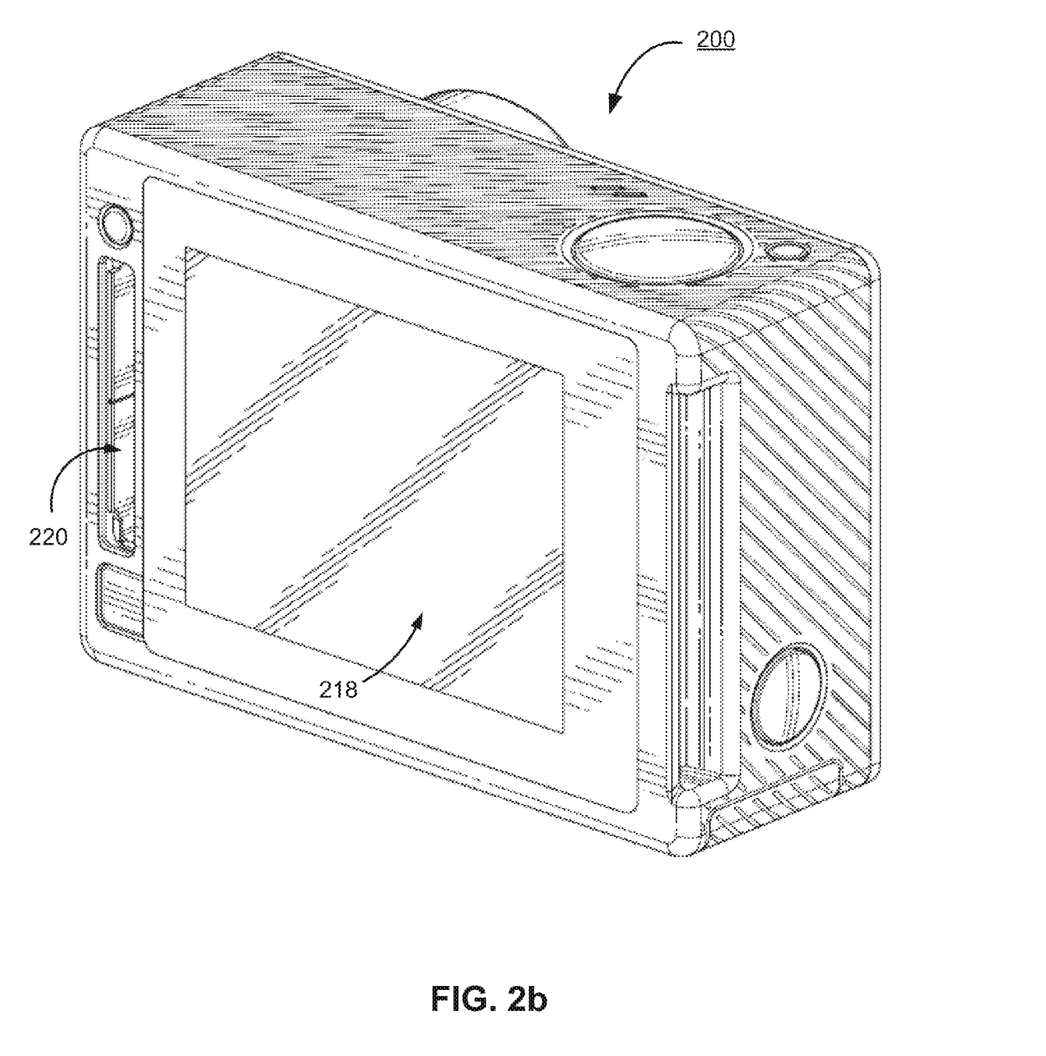
FIG. 2b illustrates a perspective view of a rear of a camera for use with the camera system, according to one embodiment.
Figure 3A:
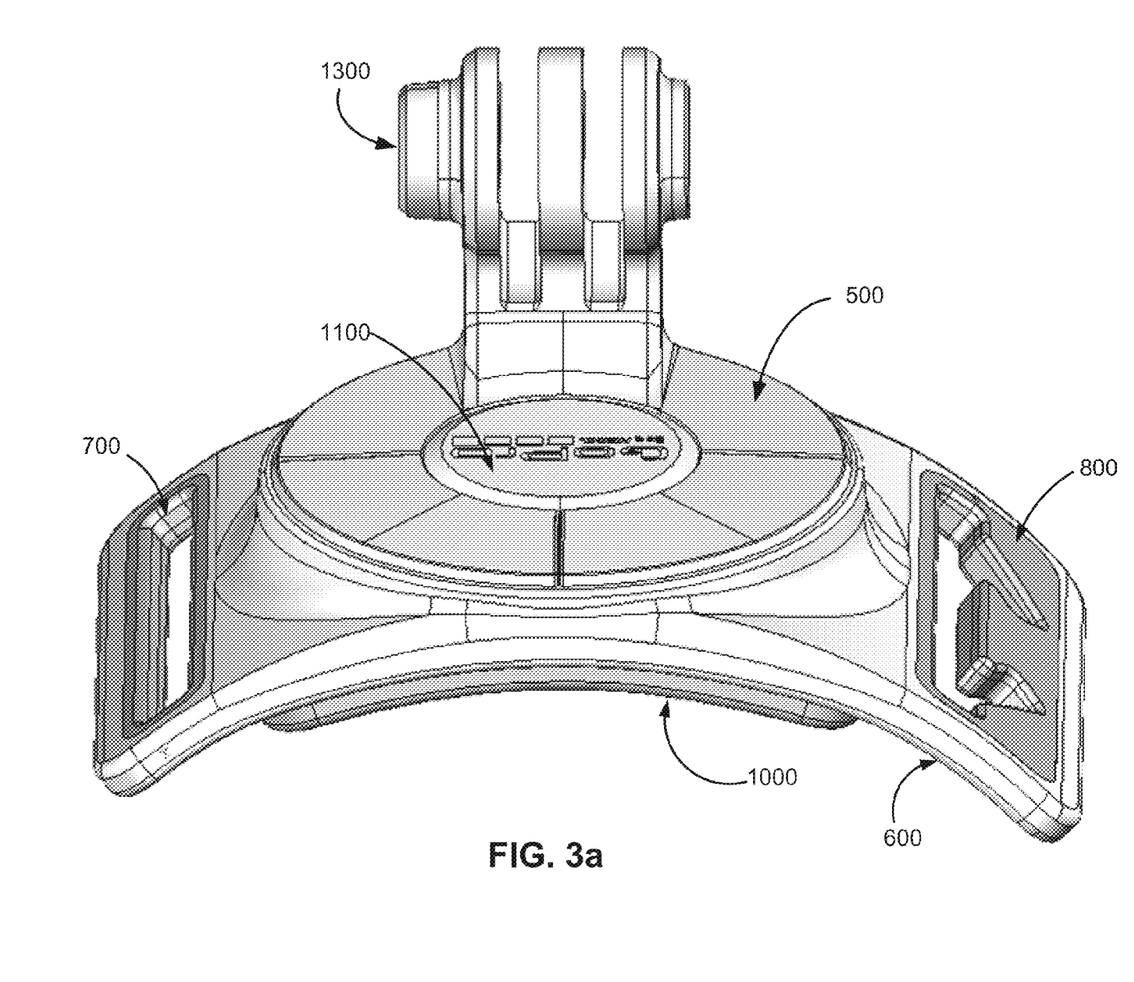
FIGS. 3a through 3c illustrate perspective views of a wrist mount, according to one embodiment.
Figure 3B:
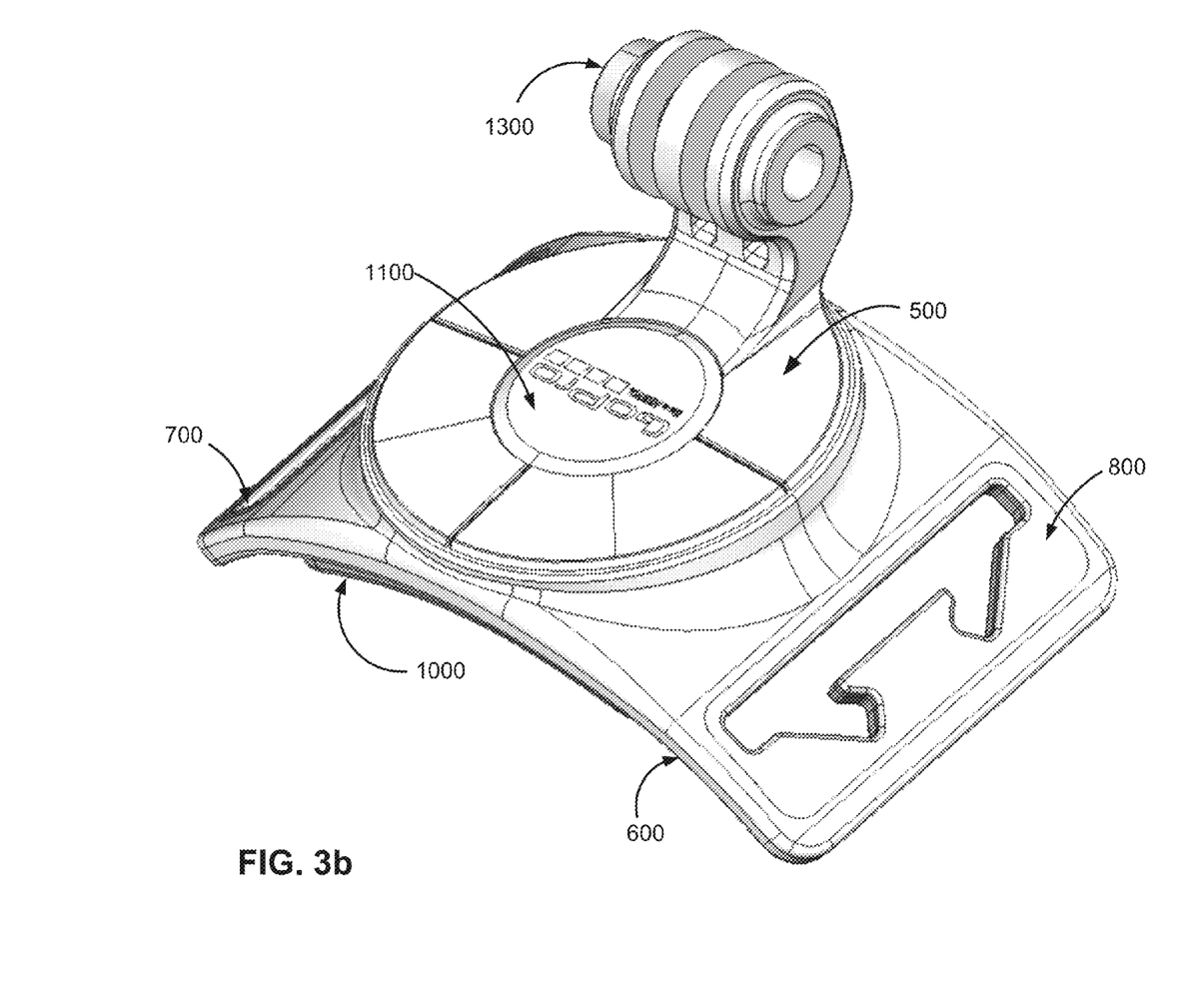
Figure 3C:
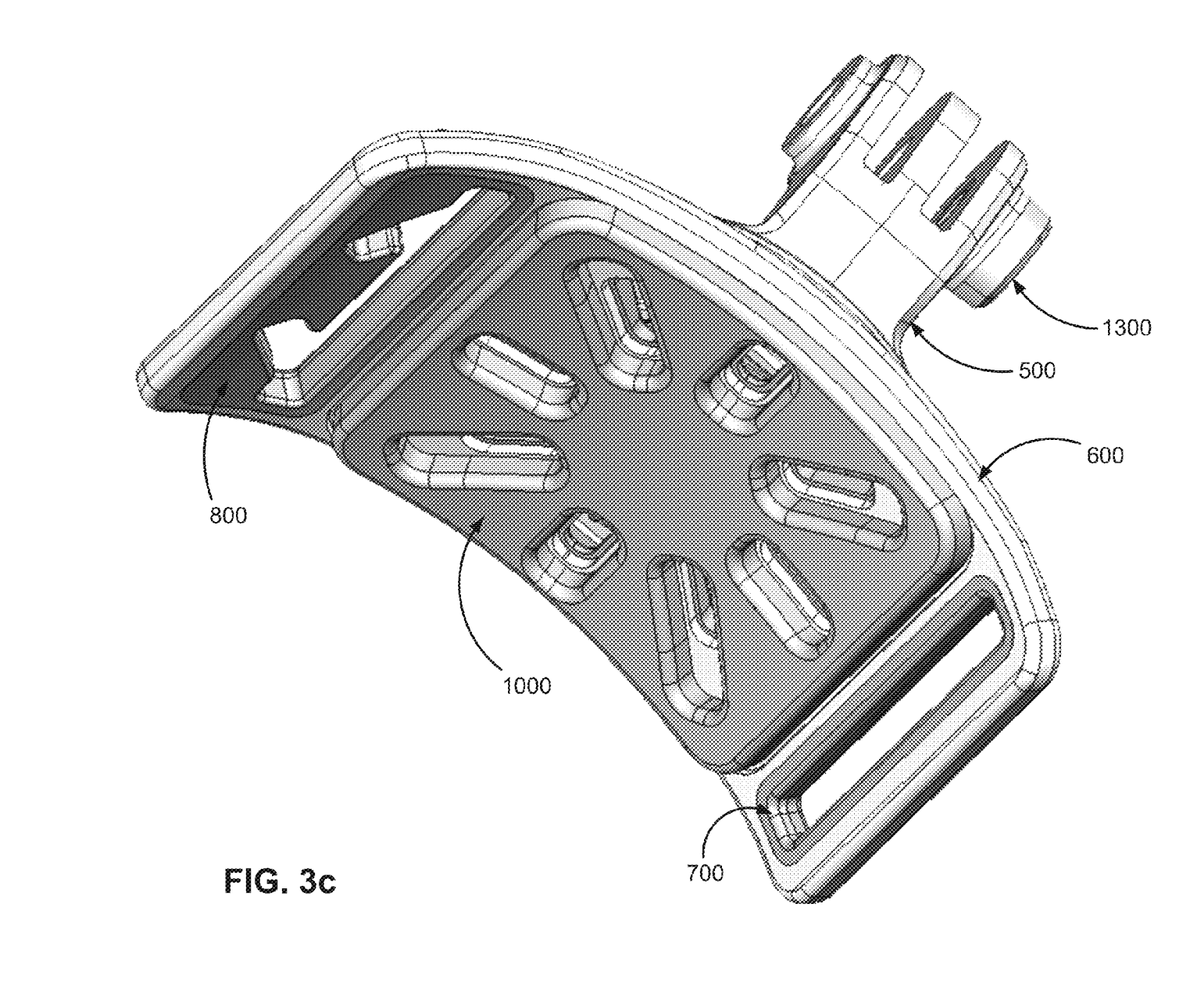

FIG. 2b illustrates a perspective view of a rear of a camera 200 for use with the camera systems described herein, according to one embodiment. The camera 200 includes a display 218 (such as an LCD or LED display) on the rear surface of the camera 200. The display 218 can be configured for use, for example, as an electronic view finder, to preview captured images or videos, or to perform any other suitable function. The camera 200 also includes an expansion pack interface 220 configured to receive a removable expansion pack, such as an extra battery module, a wireless module, and the like. Removable expansion packs, when coupled to the camera 200, provide additional functionality to the camera via the expansion pack interface 220.

Example Camera Wrist Mount

A camera wrist mount can allow a user to mount a camera on their wrist or on the back of their hand. This allows the user to capture a different range of shots by taking advantage of the location and range of motion of their arms and/or hands. The range of motion of the camera can be adjusted even further through the ability to rotate the camera with respect to wrist mount. An exemplary wrist mount is shown in FIGS. 3a-3c and FIG. 4. It can include a center mounting component 1100, a pronged swivel component 500, camera attaching means 1300, a rippled resistance component 1200 (or "rippled spring component" herein), a gasket 1500, a wrist component 600, strap inserts 700 and 800, a base component 900, a screw 1400, and a base padding component 1000.

Figure 5A:
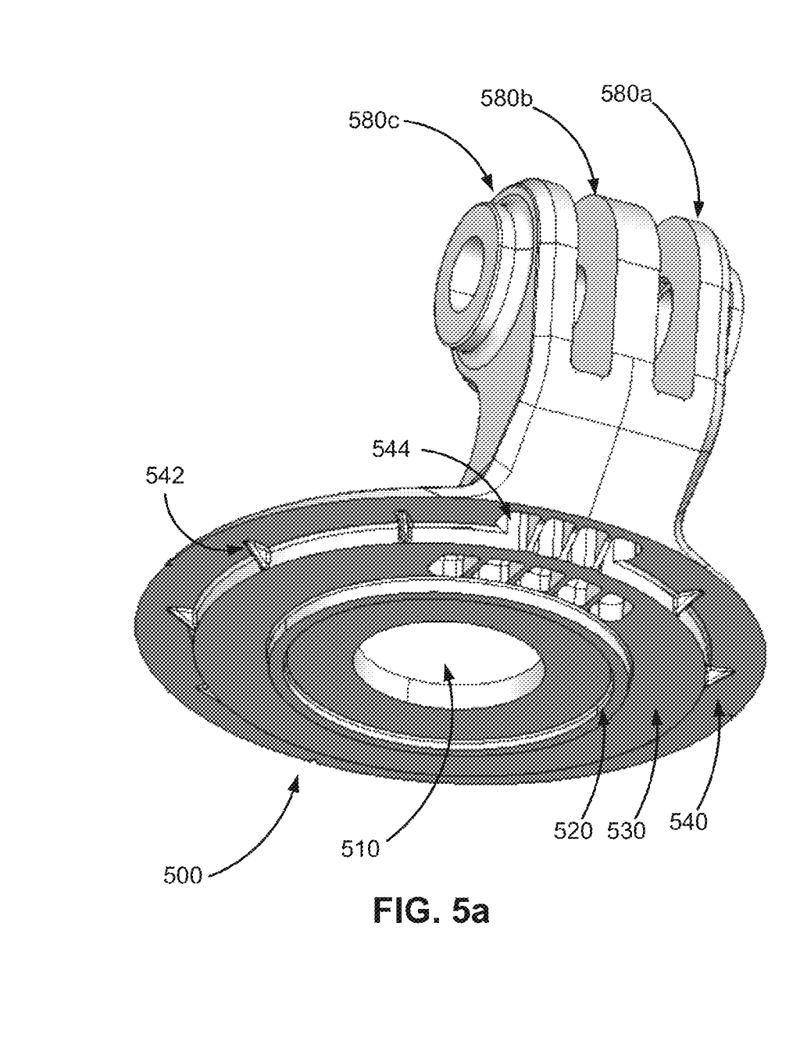
FIGS. 5a and 5b illustrate a swivel component of a wrist mount, according to one embodiment.
Figure 5B:
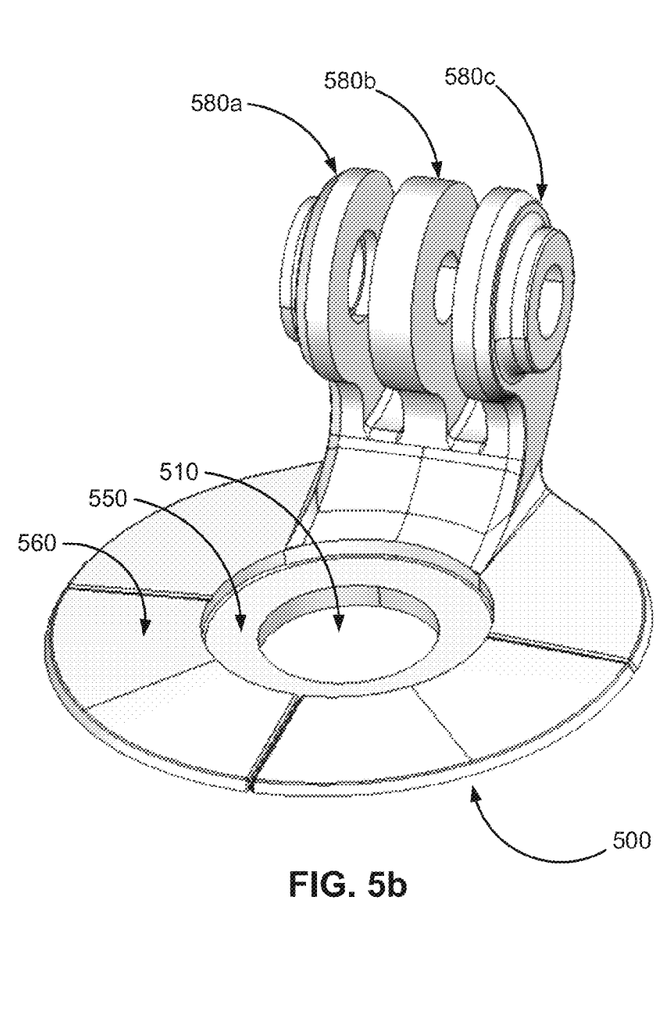
Figure 13A:
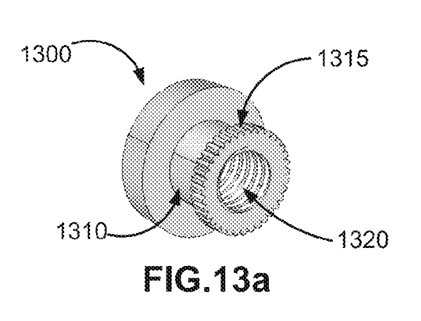
FIGS. 13a and 13b illustrate views of a third wrist mount swivel component, according to one embodiment.
Figure 13B:
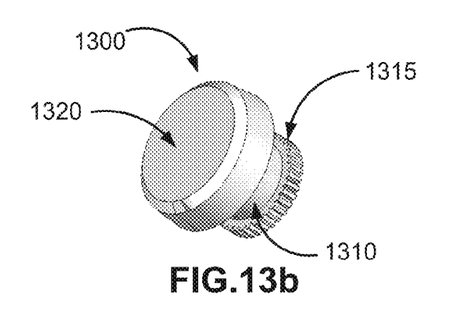

The pronged swivel component 500, illustrated in greater detail in FIGS. 5a and 5b, couples with a camera housing, for example the camera housing 100. The pronged swivel component can include multiple protrusions 580 that extend from a top surface 560 of the pronged swivel component. The protrusions 580 interlock with a reciprocal plurality of protrusions (such as protrusions 124) such that holes in the protrusions 580 and 124 align and allow for the insertion of a screw. The screw also couples with the screw receiving piece 1300 (illustrated in greater detail in FIGS. 13a and 13b). The screw receiving piece 1300 includes a protrusion 1310 with a threaded screw hole 1320, and can also include a gear component 1315. The screw can be inserted through the aligned holes and into the screw receiving piece 1300, and the gear component 1315 can be used to tighten the camera housing to the wrist mount in a first configuration, and to loosen the screw allowing for the pivotal rotation of the camera housing relative to the wrist mount in a second configuration. A bottom surface 540 of the pronged swivel component 500 can include a center hole 510, a raised bottom surface 530, one or more ridges 520 and various cutouts 544 and triangular supports 542. The center hole 510 and the ridges 520 are concentric, and allow for the pronged swivel component to be inserted into and swiveled within a wrist mount base as described below.

Figure 9A:
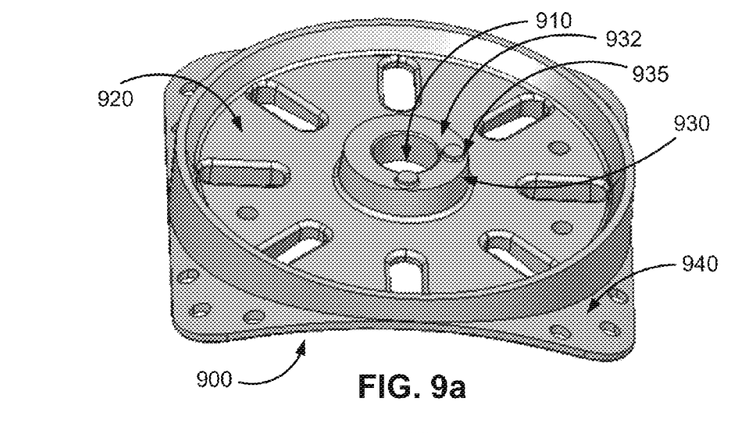
FIGS. 9a and 9b illustrate views of a wrist mount base component, according to one embodiment.
Figure 9B:
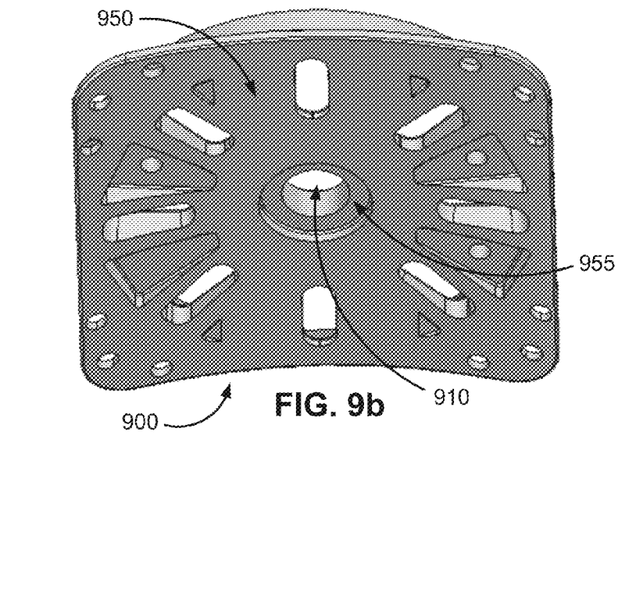
Figure 12:
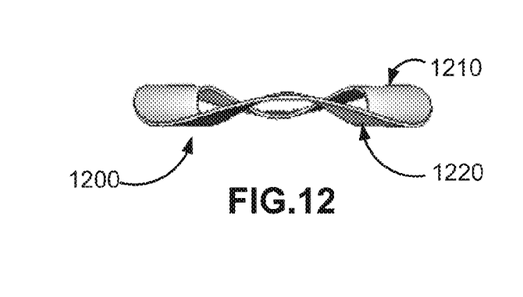
FIG. 12 illustrates views of a second wrist mount swivel component, according to one embodiment.

The rippled resistance component 1200 and the gasket 1500 stack together and abut the bottom surface 540 of the pronged swivel component 500 between the ridge 520 and the center hole 510. The rippled resistance component 1200 (illustrated in great detail in FIG. 12) includes a top surface 1210 and a bottom surface 1220, and includes a plurality of ripples relative to a horizontal plane defined by a footprint of the rippled resistance component, allowing for the outward exertion of spring force by the rippled resistance component when reciprocal inward force is applied onto the rippled resistance component by the wrist mount. The bottom surfaces 530 and 540 of the pronged swivel component 500 abut an inside surface 920 of the base component 900 (illustrated in greater detail in FIGS. 9a and 9b). The inside surface 920 also includes a protrusion 930 that fits through the center holes of both the rippled resistance component 1200 and the gasket 1500, as well as the center hole 510 of the pronged swivel component 500. Thus, the rippled resistance component 1200 and gasket 1500 fit in a toroid-shaped recess formed by the pronged swivel component 500 and the base component 900. This allows the pronged swivel component 500 to selectively rotate with respect to the base component 900 upon the exertion of a force on the pronged swivel component 500 that overcomes the outward spring force applied by the rippled resistance component and the resulting friction force generated between the rippled resistance component and the pronged swivel component by a user of the wrist mount. Further, the friction force generated by the rippled resistance component upon the pronged swivel component can secure the pronged swivel into position relative to the base component 900 in the presence of, for example, wind force acting upon the pronged swivel component 500 or camera. In other words, the rippled resistance component 1200 generates reciprocal outward spring force upon the pronged swivel component 500 and the base component 900 when it is compressed, exerting a normal force on the bottom surface 530 of the pronged swivel component 500 and the inside surface 920 of the base component 900, and generating friction between the bottom surface 530 and the inside surface 920. As described above, due to this friction force, the pronged swivel component 500 can be rotated by a targeted force applied by a human but insulated from small forces caused by environmental and situational factors, like wind and sudden movements.

Figure 6:
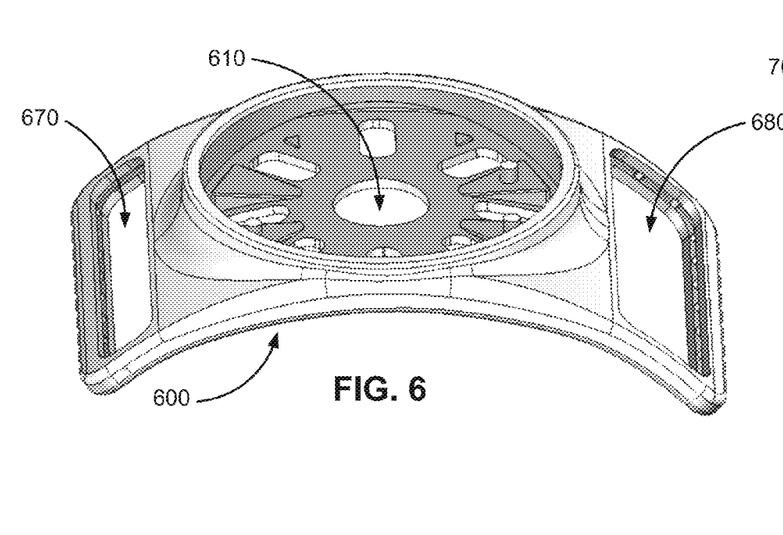
FIG. 6 illustrates an assembled wrist component, according to one embodiment.
Figure 7A:
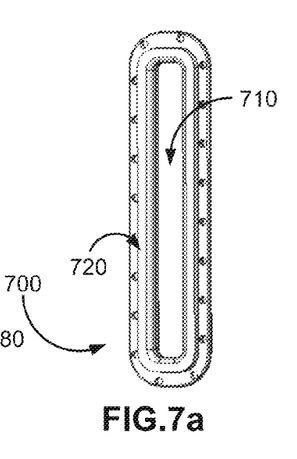
FIGS. 7a and 7b illustrate a first wrist mount base strap hole, according to one embodiment.
Figure 7B:
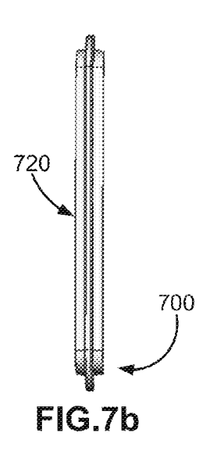
Figure 8A:
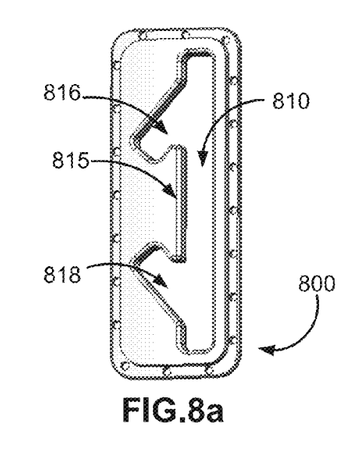
FIGS. 8a and 8b illustrate a second wrist mount base strap hole, according to another embodiment.
Figure 8B:
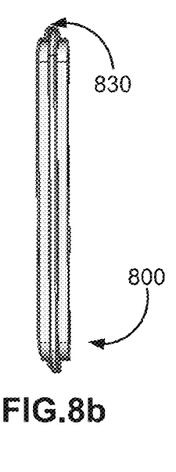

The base component 900 (illustrated in greater detail in FIGS. 9 and 9b) is secured to the wrist component 600 (illustrated in greater detail in FIG. 6) by one of: 1) inserting the base component 900 up into the bottom surface of the wrist component 600 such that the top surface 940 abuts a bottom surface of the wrist component, 2) inserting the base component 900 onto the top surface 620 of the wrist component 600, or 3) securing the base component 900 within layers of the wrist component 600. The strap interface inserts 700 and 800 (illustrated in greater detail in FIGS. 7a and 7b, and FIGS. 8a and 8b, respectively) are also secured in the insert holes 670 and 680 of the wrist component 600. The strap insert 700 fits into a corresponding strap insert hole 670 in the wrist component 600. The inside edge of the strap insert hole has a small recess that can accommodate a ridge 720 of the strap insert. Similarly, the strap insert 800 fits into a corresponding strap insert hole 680 in the wrist component 600 that also has a small recess on the inside edge of the strap hole 680 that can accommodate a ridge 830 of the strap insert 800. The strap insert 700 includes a slit 710 that can accommodate a wrist. The strap insert 800 has a slit 810 that can accommodate several strap configurations. The slit 810 also includes a supportive protrusion 815 and strap cutouts 816 and 818. Thus, the slit 810 is shaped such that the strap insert 800 can accommodate a wide strap supported by protrusion 815, or two smaller straps at angles supported within cutouts 816 and 818 (for instance, to allow the wrist mount to be worn on the back of the hand, with each of the two smaller straps securing the wrist mount to the back of the hand on either side of the thumb).

Figure 4:
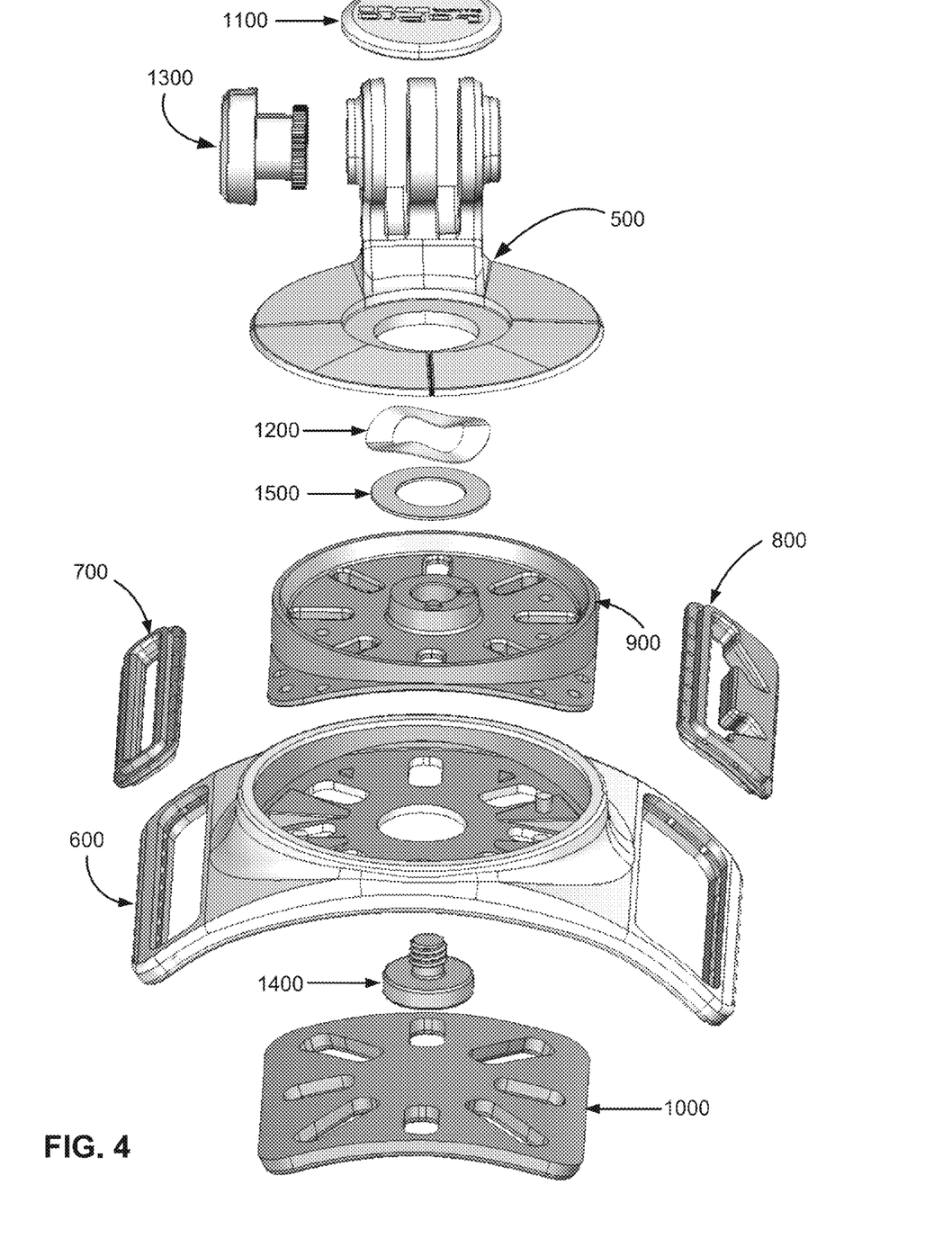
FIG. 4 illustrates an exploded view of a wrist mount, according to one embodiment.

The base component 900 and pronged swivel component 500 are aligned as illustrated in FIG. 4 and secured together with the center mounting component 1100 and a screw 1400. The center mounting component 1100 includes a protrusion 1130 and a threaded hole 1135. The diameter of a bottom surface 1120 of the center mounting component 1100 is the same size as, or slightly smaller than the diameter of the recessed surface 550 of the pronged swivel component 500. This allows a top surface 1110 of the center mounting component 1100 to lay substantially flush with the top surface 560 of the pronged swivel component 500. The protrusion 1130 fits through the hole 910 of the base component 900. The screw 1400 is then inserted into the threaded hole 1135 of the center mounting component from the below the base mount 900 to secure the base mount 900, pronged swivel component 500 and center mounting component 1100 together. The bottom surface 1120 of the center mounting component 1100 and the top surface 932 of the protrusion 930 of the base component 900 can also have reciprocal protrusions 935 and slots 1125 to ensure that the center mounting component 1100 and base component 900 do not rotate relative to each other.

Figure 10A:
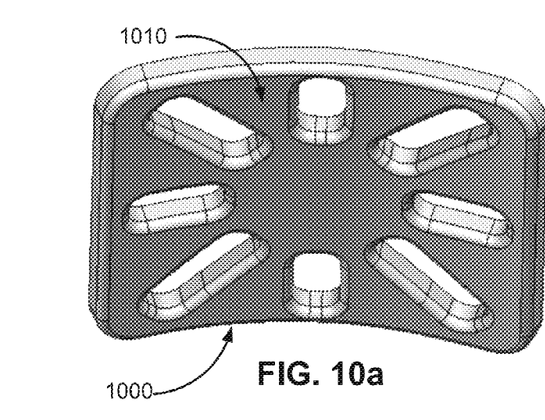
FIGS. 10a and 10b illustrate views of a wrist mount padding component, according to one embodiment.
Figure 10B:
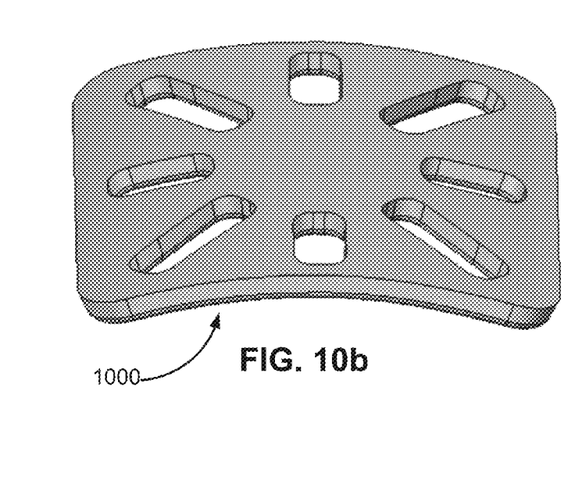
Figure 11A:
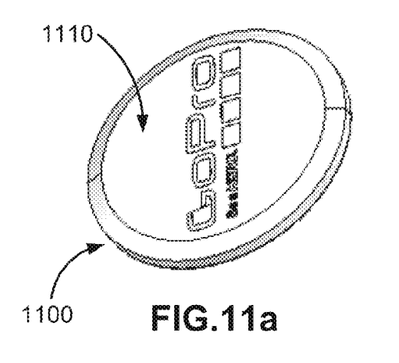
FIGS. 11a and 11b illustrate views of a first wrist mount swivel component, according to one embodiment.
Figure 11B:
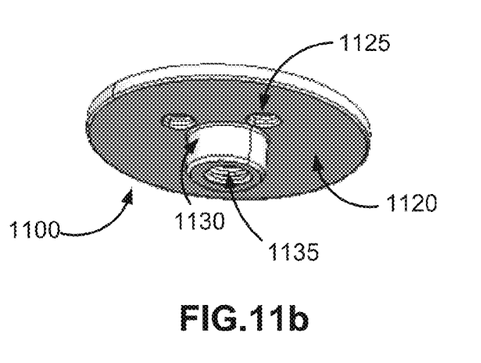

The bottom surface 950 of the base component 900 can also have a recessed surface 955 that can accommodate the diameter of the head of the screw 1400. The hole 610 of the wrist component 600 can also be of the same diameter, such that the head of the screw 1400 can lay substantially flush with the bottom surface 640 of the wrist component. The base padding component 1000 (illustrated in greater detail in FIGS. 10a and 10b) can be secured to the bottom surface of the wrist component 600 (for instance, with adhesive or any other suitable method), covering the head of the screw 1400, such that the holes of the base padding component align with holes within the wrist component 600. This also allows the wrist mount to better conform to a user's hand or wrist, and provides a cushion for the wrist mount. In some embodiments, the base padding component 1000, the base component 900 and the wrist 600 have various cutouts that can be used for ventilation.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera mount as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A wrist mount for coupling a camera to a user, comprising:
    a swivel component, the swivel component comprising means for attaching to a camera system and further comprising a first center hole;
    a rippled spring component configured to exert a reciprocal outward force in response to the application of an inward compressive force upon the rippled spring component, the rippled spring component comprising a second center hole;
    a wrist component comprising a top surface, a circular recess within the top surface, a bottom surface, and a third center hole within the circular recess, the swivel component configured to abut the wrist component within the circular recess;
    a base component comprising a fourth center hole, the base component configured to abut the bottom surface of the wrist component;
    a base padding component secured to the base component and configured to abut a wrist of the user when the wrist mount is worn by the user; and
    a screw configured for insertion through the first center hole, the second center hole, the third center hole, and the fourth center hole, the screw further configured to secure the swivel component to the wrist component such that the rippled spring component is secured between the swivel component and the wrist component, and to secure the wrist component to the base component.

2. The wrist mount of claim 1, wherein the wrist component comprises a first slit and a second slit, the first slit and the second slit configured to accommodate a strap such that the strap can secure the wrist mount to the user.

3. The wrist mount of claim 1, further comprising a gasket inserted between the rippled spring component and the wrist component.

4. The wrist mount of claim 1, wherein the swivel component is configured to rotate at least 360 degrees relative to the wrist component.

5. The wrist mount of claim 2, wherein at least one slit of the first slit and the second slit includes strap cutouts angled relative to the at least one slit, the strap cutouts configured to accommodate a first strap component and a second strap component and to enable the user to position the first strap component and the second strap component on opposite sides of a thumb of the user.

6. The wrist mount of claim 4, wherein the swivel component is configured to rotate relative to the wrist component only in response to an above-threshold force exerted upon the swivel component.

7. A camera mount, comprising:
    a swivel component, the swivel component comprising means for attaching to a camera system and further comprising a first center hole;
    a rippled spring component configured to exert a reciprocal outward force in response to the application of an inward compressive force upon the rippled spring component, the rippled spring component comprising a second center hole;
    a wrist component comprising a top surface, a circular recess within the top surface and a third center hole within the circular recess, the swivel component configured to abut the wrist component within the circular recess and to rotate at least 360degrees relative to the wrist component; and
    a screw configured for insertion through the first center hole, the second center hole, and the third center hole, the screw further configured to secure the swivel component to the wrist component such that the rippled spring component is secured between the swivel component and the wrist component.

8. The camera mount of claim 7, further comprising:
a base padding component secured to the wrist component and configured to abut a wrist of a user when the camera mount is worn by the user.

9. The camera mount of claim 7, wherein the wrist component comprises a first slit and a second slit, the first slit and the second slit configured to accommodate a strap such that the strap can secure the camera mount to the user.

10. The camera mount of claim 7, further comprising a gasket inserted between the rippled spring component and the wrist component.

11. The camera mount of claim 7, wherein the swivel component is configured to rotate relative to the wrist component only in response to an above-threshold force exerted upon the swivel component.

12. The camera mount of claim 9, wherein at least one slit of the first slit and the second slit includes strap cutouts angled relative to the at least one slit, the strap cutouts configured to accommodate a first strap component and a second strap component and to enable the user to position the first strap component and the second strap component on opposite sides of a thumb of the user.

13. A camera mount, comprising:
a swivel component, the swivel component comprising means for attaching to a camera system;
a spring component configured to exert a reciprocal outward force in response to the application of an inward compressive force upon the spring component;
a wrist component comprising a top surface, a circular recess within the top surface, the swivel component configured to abut the wrist component within the circular recess;
a base padding component secured to the wrist component and configured to abut a wrist of a user when the camera mount is worn by the user; and
attachment means configured to secure the swivel component to the wrist component such that the spring component is secured between the swivel component and the wrist component.

14. The camera mount of claim 13, wherein the wrist component comprises a first slit and a second slit, the first slit and the second slit configured to accommodate a strap such that the strap can secure the camera mount to the user.

15. The camera mount of claim 13, further comprising a gasket inserted between the spring component and the wrist component.

16. The camera mount of claim 13, wherein the swivel component is configured to rotate at least 360 degrees relative to the wrist component.

17. The camera mount of claim 14, wherein at least one slit of the first slit and the second slit includes strap cutouts angled relative to the at least one slit, the strap cutouts configured to accommodate a first strap component and a second strap component and to enable the user to position the first strap component and the second strap component on opposite sides of a thumb of the user.

18. The camera mount of claim 16, wherein the swivel component is configured to rotate relative to the wrist component only in response to an above-threshold force exerted upon the swivel component.

* * * * *